United States Patent
Aoyama

(10) Patent No.: US 7,864,227 B2
(45) Date of Patent: Jan. 4, 2011

(54) IMAGE SENSING APPARATUS WITH VARIABLE RATE ZOOM (AUTO ZOOM) AND FASTEST RATE ZOOM (QUICK ZOOM)

(75) Inventor: Satoshi Aoyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 709 days.

(21) Appl. No.: 11/045,107

(22) Filed: Jan. 31, 2005

(65) Prior Publication Data

US 2005/0174450 A1  Aug. 11, 2005

(30) Foreign Application Priority Data

Feb. 6, 2004  (JP) ............................. 2004-031412

(51) Int. Cl.
    *H04N 5/262* (2006.01)
(52) U.S. Cl. .................................. 348/240.3
(58) Field of Classification Search ............. 348/240.1, 348/240.2, 240.3, 340, 345, 347, 359, 240.99; 359/354, 355, 699, 701; 396/60, 76, 85, 396/379
    See application file for complete search history.

(56) References Cited

U.S. PATENT DOCUMENTS

| 3,834,796 | A | * | 9/1974 | Komine ..................... 359/697 |
| 4,851,869 | A |   | 7/1989 | Ishimaru et al. ........... 354/195.1 |
| 5,148,199 | A | * | 9/1992 | Kohmoto et al. .............. 396/86 |
| 6,219,098 | B1 | * | 4/2001 | Kawamura et al. .......... 348/335 |
| 6,292,313 | B1 | * | 9/2001 | Kanayama et al. .......... 359/823 |
| 6,421,504 | B1 | * | 7/2002 | Saito et al. ..................... 396/67 |

FOREIGN PATENT DOCUMENTS

| JP | 1-161325 | 6/1989 |
| JP | 5-188268 | 7/1993 |
| JP | 7-27965 | 1/1995 |

* cited by examiner

*Primary Examiner*—Nicholas G Giles
(74) *Attorney, Agent, or Firm*—Fitzpatrick, Cella, Harper & Scinto

(57) ABSTRACT

In an image sensing apparatus having a zoom lens, a zoom ring that designates driving of the zoom ring at the time of image sensing, a power switch, and a zoom controller of the zoom lens that is capable of changing a driving speed of the zoom lens, it is determined whether or not operation of the zoom ring is performed in combination with predetermined operation of the power switch. In a case where the operation is performed in combination, the driving direction of the zoom lens designated by the zoom ring is detected, and driving of the zoom lens is continued in the detected driving direction during performance of the predetermined operation of the power switch irrespective of continuation or discontinuation of the zoom ring operation.

8 Claims, 4 Drawing Sheets

F I G. 3A
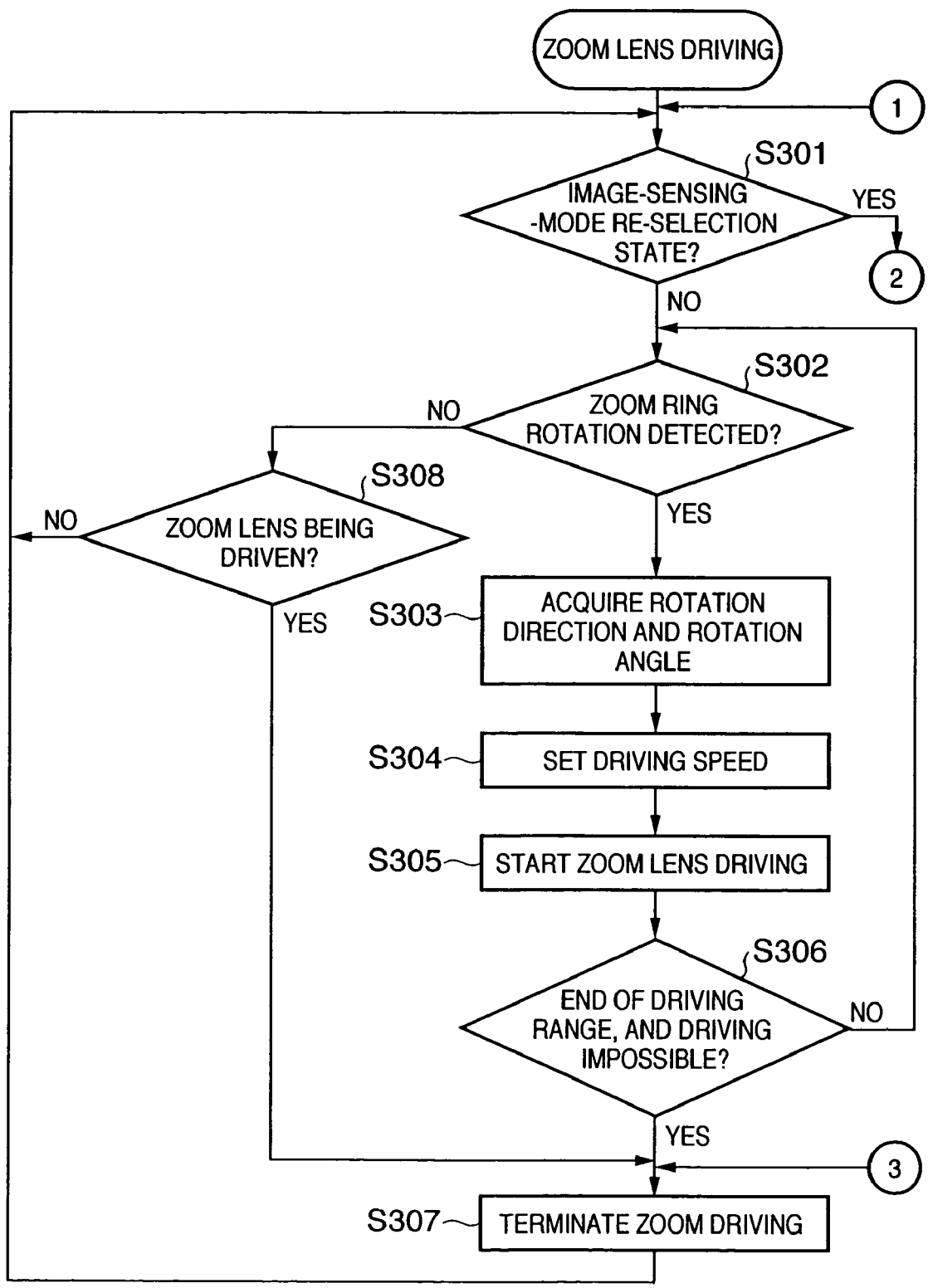

IMAGE SENSING APPARATUS WITH VARIABLE RATE ZOOM (AUTO ZOOM) AND FASTEST RATE ZOOM (QUICK ZOOM)

FIELD OF THE INVENTION

The present invention relates to an image sensing apparatus and a control method thereof, and more particularly, to a control of driving a zoom lens incorporated in an image sensing apparatus.

BACKGROUND OF THE INVENTION

Conventional zoom mechanisms of a camera having a zoom function include a power-zoom mechanism which is realized by driving a motor, and a manual zoom mechanism which changes magnification by manual operation. In general, a camera employing the power-zoom mechanism has an advantage of enabling to change the magnification with ease by operating zoom buttons provided respectively for a telephoto direction or a wide-angle direction or a lever. Meanwhile, in the manual zoom mechanism, rotating a zoom ring provided in a lens portion enables to change the zoom magnification for the amount of rotation in a rotated direction. This provides an advantage of intuitive and meticulous adjustment. In view of this, proposed is a zoom lens driving method, which employs a zoom ring for operation that takes advantage of its operability, and which performs actual lens driving by controlling a power-zoom in accordance with operation of the zoom ring (e.g., Japanese Patent Application Laid-Open No. 5-188268 and No. 7-27965).

However, in a case where a zoom ring is adopted as a zoom operation member, a camera having a high-magnification zoom function has a long zoom lens moving distance from the telephoto end to the wide-angle end. Therefore, the time required to keep rotating the zoom ring is long, imposing burdensome zoom ring operation on a user. Furthermore, since achieving a desired angle of view takes a while, a user sometimes misses an image sensing opportunity.

SUMMARY OF THE INVENTION

The present invention has been made in consideration of the above situation, and has as its first object to reduce burden on a user upon designating a change in an angle of view.

Furthermore, a second object of the present invention is to achieve a desired angle of view at high speed.

According to the present invention, the foregoing objects are attained by providing an image sensing apparatus comprising:

a zoom designation unit that designates driving of a zoom lens when image sensing is performed;

a detection unit that detects a driving direction of the zoom lens, which is designated by the zoom designation unit;

an operation unit that gives instructions other than driving designation of the zoom lens;

a driving unit of the zoom lens that is capable of changing a driving speed of the zoom lens in accordance with an operation amount of the zoom designation unit; and a control unit that controls the driving unit by a first driving method in a case where operation of the zoom designation unit is performed in combination with predetermined operation of the operation unit, the first driving method realizing continuous driving of the zoom lens in the driving direction detected by the detection unit during performance of the predetermined operation irrespective of continuation or discontinuation of operation of the zoom designation unit.

According to the present invention, the foregoing objects are attained by providing a control method of an image sensing apparatus having a zoom designation unit that designates driving of a zoom lens when image sensing is performed, an operation unit that gives instructions other than driving designation of the zoom lens, and a driving unit of the zoom lens that is capable of changing a driving speed of the zoom lens in accordance with an operation amount of the zoom designation unit, the method comprising:

determining whether or not operation of the zoom designation unit is performed in combination with predetermined operation of the operation unit;

detecting a driving direction of the zoom lens, which is designated by the zoom designation unit; and controlling the driving unit by a first driving method in a case where it is determined that the operation of the zoom designation unit is performed in combination with the predetermined operation of the operation unit, the first driving method realizing continuous driving of the zoom lens in the detected driving direction during performance of the predetermined operation irrespective of continuation or discontinuation of operation of the zoom designation unit.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate an embodiment of the invention and, together with the description, serve to explain the principles of the invention.

FIGS. 3A and 3B show flowcharts describing zoom processing according to the embodiment of the present invention.

DETAILED DESCRIPTION OF THE PREFERRED EMBODIMENT

A preferred embodiment of the present invention will now be described in detail in accordance with the accompanying drawings. However, the dimensions, shapes and relative positions of the constituent parts shown in the embodiment should be changed as convenient depending on various conditions and on the structure of the apparatus adapted to the invention, and the invention is not limited to the embodiment described herein.

Figure 1:
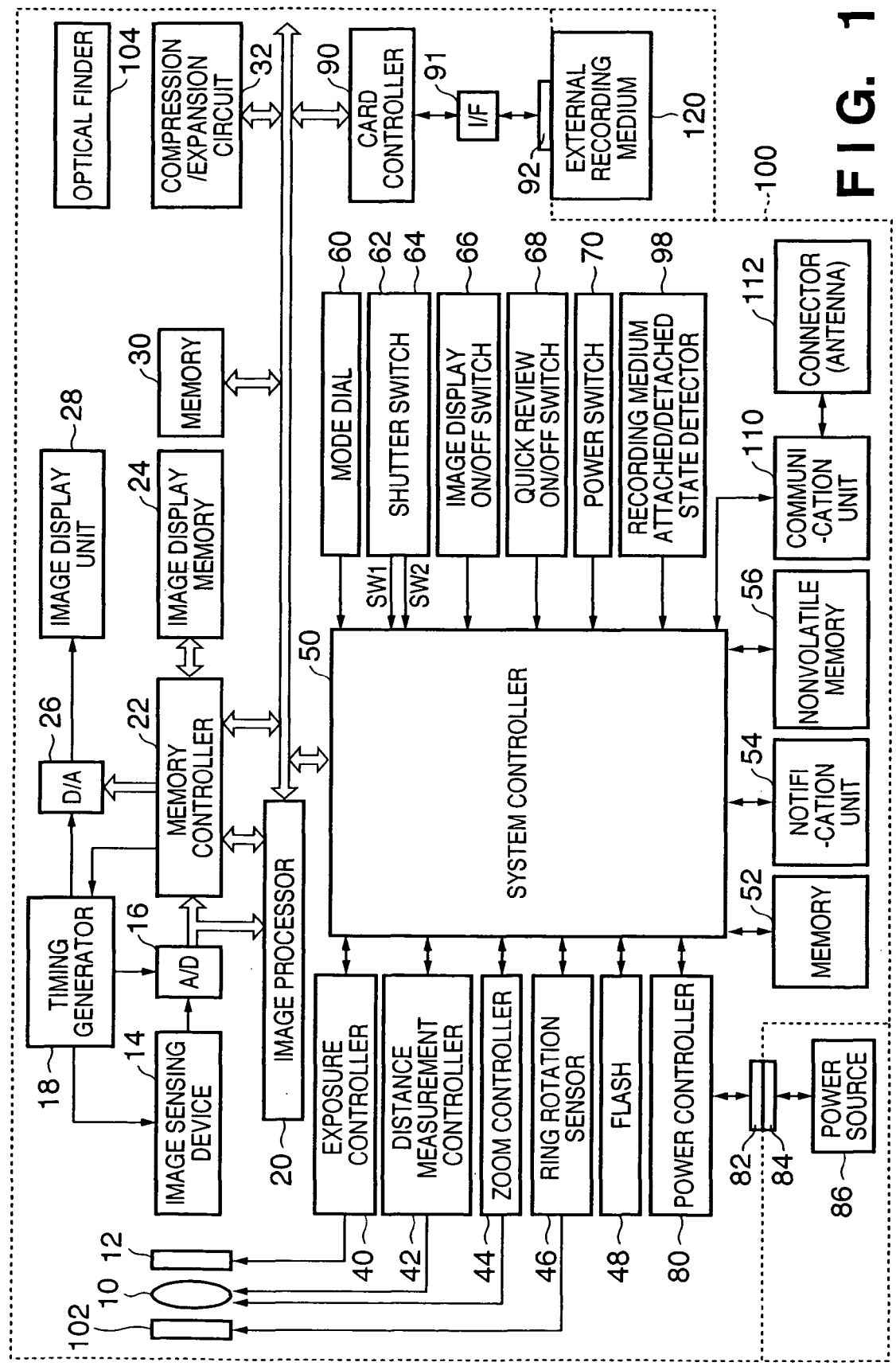
FIG. 1 is a block diagram showing a configuration of an image sensing apparatus according to an embodiment of the present invention.

FIG. 1 is a block diagram showing a configuration of an image sensing apparatus according to an embodiment of the present invention.

In FIG. 1, reference numeral 100 denotes an image sensing apparatus according to the present embodiment. The image sensing apparatus 100 may be any of a digital camera and a silver-halide film camera. This embodiment describes a case where the image sensing apparatus 100 is a digital camera.

In the image sensing apparatus 100, numeral 10 denotes an image sensing lens; 12, a shutter having a diaphragm function; 14, an image sensing device which converts an optical image into an electric signal; and 16, an A/D converter which converts an analog signal outputted from the image sensing device 14 into a digital signal.

Numeral 18 denotes a timing generator which supplies a clock signal and a control signal respectively to the A/D converter 16 and a D/A converter 26, under the control of a memory controller 22 and a system controller 50.

Numeral 20 denotes an image processor which performs predetermined pixel interpolation processing, color conversion processing and the like on image data from the A/D converter 16 or image data from the memory controller 22. The image processor 20 performs predetermined calculation processing using the image data outputted from the A/D converter 16, and the system controller 50 performs through-the-lens (TTL) auto focus (AF) processing, auto exposure (AE) processing, pre-flash (EF) processing with respect to an exposure controller 40 and a distance measurement controller 42, based on the result of calculations. Further, the image processor 20 performs predetermined calculation using the image data outputted from the A/D converter 16, and performs TTL auto white balance (AWB) processing, based on the result of calculations.

The memory controller 22 controls the A/D converter 16, the timing generator 18, the image processor 20, an image display memory 24, the D/A converter 26, a memory 30 and a compression/expansion circuit 32. The image data outputted from the A/D converter 16 is written into the image display memory 24 or the memory 30 via the image processor 20 and the memory controller 22, or only via the memory controller 22.

Numeral 24 denotes the image display memory; 26, the D/A converter; and 28, an image display unit comprising a liquid crystal display (LCD) or the like. Image data written into the image display memory 24 is displayed on the image display unit 28 via the D/A converter 26.

An electronic finder function can be realized by sequentially displaying sensed images on the image display unit 28. Further, image display unit 28 can turn ON/OFF its display in accordance with an instruction from the system controller 50. When the display of the image display unit 28 is turned OFF, the electric consumption of the image sensing apparatus 100 can be greatly reduced.

The memory 30, used for storing obtained still images and moving images, has a sufficient storage capacity for storing a predetermined number of still images and a moving image for a predetermined period. In sequential image sensing to sequentially obtain a plural number of still images or panoramic image sensing, a large amount of image data can be written into the memory 30 at high speed. Further, the memory 30 may be used as a work area for the system controller 50.

The compression/expansion circuit 32 has a function for compressing image data read from the memory 30 by a predetermined image compression method (adaptive discrete cosine transformation (ADCT) or the like) and writing the compressed image data in the memory 30, and a function for expanding image data read from the memory 30 and writing the expanded image data in the memory 30.

The exposure controller 40 controls the shutter 12 having the diaphragm function. The exposure controller 40 interlocked with a flash 48 also has a flash adjusting function. The distance measurement controller 42 controls focusing of the image sensing lens 10. Numeral 44 denotes a zoom controller which controls zooming of the image sensing lens 10. Numeral 102 denotes a zoom ring incorporating an encoder, which outputs a pulse signal in accordance with rotation of the zoom ring. The zoom ring 102 having a ring form is provided on the optical axis of the image sensing lens 10.

Numeral 46 denotes a ring rotation sensor which detects a rotation amount based on a rotation direction and a rotation angle from a signal which is outputted from the encoder of the zoom ring 102 upon operation of the zoom ring 102. The zoom controller 44 can drive the zoom lens at driving speed corresponding to the detected result of the ring rotation sensor 46.

The flash 48 has an AF auxiliary light projection function and a flash adjusting function. The system controller 50 controls the exposure controller 40 and the distance measurement controller 42 by the TTL method, in accordance with the result of calculations by the image processor 20 based on the image data from the A/D converter 16.

The system controller 50 controls the overall image sensing apparatus 100. Memory 52 stores the constants, variables, and programs for operation of the system controller 50.

Numeral 54 denotes a notification unit, such as a display device and a speaker, which notifies operating statuses, messages and the like to the user by using texts, images, sound and the like, in correspondence with execution of a program by the system controller 50. The notification unit 54 is provided in a single or plural visually-recognizable positions around the operation unit of the image sensing apparatus 100. The notification unit 54 comprises, for instance, a combination of an LCD, an LED, and a sound generating device. Further, part of functions of the notification unit 54 are provided within an optical finder.

The display contents of the notification unit 54, displayed on the LCD or the like, include indication of single shot/sequential image sensing, a self timer, a compression rate, the number of recording pixels, the number of recorded images, the number of recordable images, shutter speed, an f number (aperture), exposure compensation, flash illumination, pink-eye effect mitigation, macro image sensing, a buzzer-set state, a timer battery level, a battery level, an error state, information using plural digit numbers, attached/detached status of a recording medium 120, operation of communication I/F, and date and time.

Further, the display contents of the notification unit 54, displayed within the optical finder 104, include a focus state, a camera shake warning, a flash charge state, the shutter speed, the f number (aperture), and the exposure compensation.

Numeral 56 denotes an electrically erasable and recordable nonvolatile memory such as an EEPROM.

Numerals 60, 62, 64, 66, 68 and 70 denote operation means for inputting various operation instructions to the system controller 50, comprising a single or plurality of combinations of switches, dials, touch panels, a device for pointing by line-of-sight detection, a voice recognition device, and the like.

Next, the operation means will be described in more detail.

Numeral 60 denotes a mode dial switch for selecting various function modes such as an automatic image sensing mode, a panoramic image sensing mode, a multi-image reproduction/deletion mode, and a PC connection mode.

Figure 2:
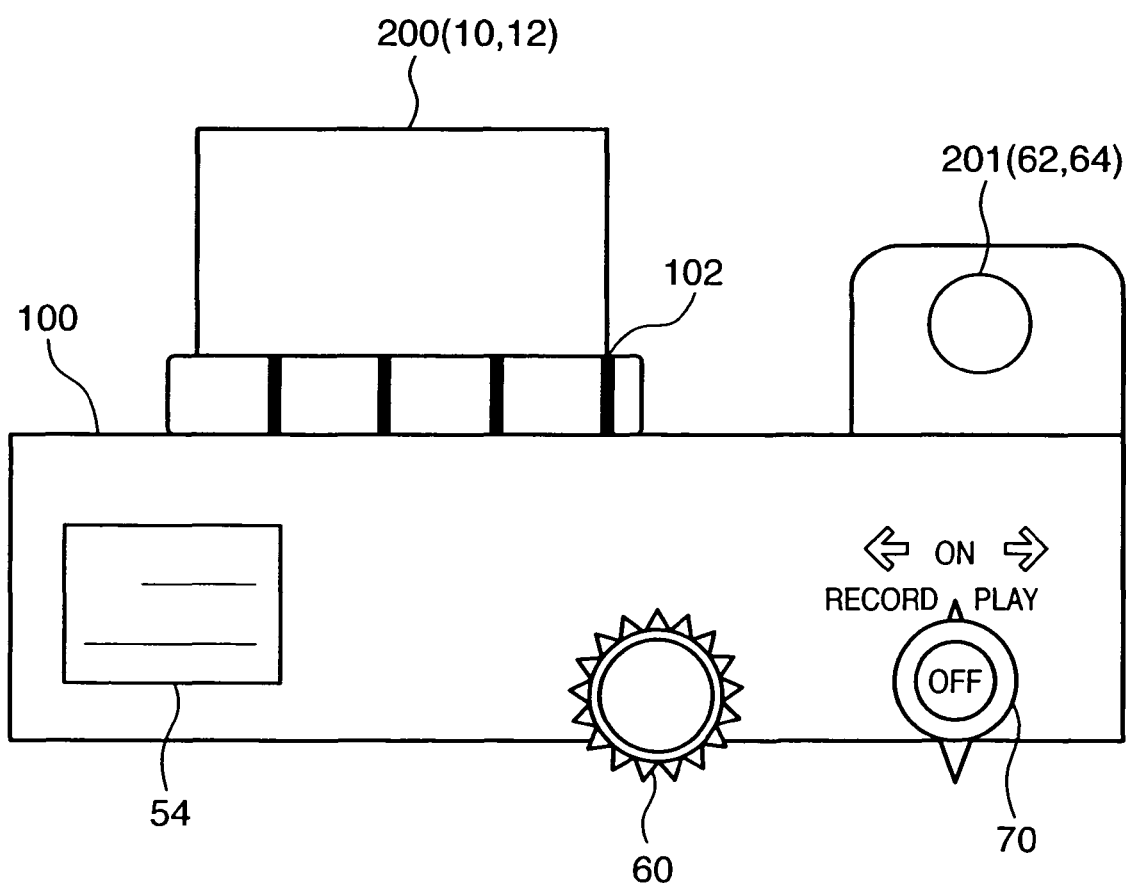
FIG. 2 is a top view showing an external appearance of the image sensing apparatus according to the embodiment of the present invention.

Numeral 62 denotes a shutter switch SW1 turned ON by half stroke of a release button 201 shown in FIG. 2, to instruct start of the operations of the AF processing, the AE processing, the AWB processing, the EF processing and the like.

Numeral 64 denotes a shutter switch SW2 turned ON by full stroke of the release button 201 shown in FIG. 2, to instruct start of a series of operations of exposure processing to write a signal read from the image sensing device 14 into the memory 30, via the A/D converter 16 and the memory controller 22, development processing by using calculations by the image processor 20 and the memory controller 22, and recording processing to read the image data from the memory 30, compress the image data by the compression/expansion circuit 32, and write the compressed image data into the recording medium 120.

An image display ON/OFF switch 66 can turn ON/OFF the image display unit 28. With this function, in image sensing using the optical finder 104, power supply to the image display unit 28 comprising a TFT LCD or the like, can be cut off to save the power.

A quick review ON/OFF switch 68 sets on/off of the quick review function for automatically reproducing sensed image data immediately after image sensing. In this embodiment, especially, the switch 68 has a function of setting the quick review function in the OFF state of the image display unit 28.

A power switch 70 turns on/off the power of the image sensing apparatus 100.

Although not shown in the drawing, the image sensing apparatus 100 comprises an operation unit having various buttons and a touch panel besides those described above, including a menu button, a set button, a macro/non-macro selection button, a multi-image reproduction/repaging button, a flash setting button, a single-shot/sequential/self-timer image sensing selection button, a forward (+) menu item selection button, a backward (−) menu item selection button, a forward (+) reproduction image search button, a backward (−) reproduction image search button, an image sensing quality selection button, an exposure compensation button, and a date/time set button.

Numeral 80 denotes a power controller comprising a battery detection circuit, a DC-DC converter, a switch circuit for selecting the block to be energized and the like. The power controller 80 detects the attached/detached state of the battery, the battery type and the remaining battery power level, controls the DC-DC converter based on the results of detection and an instruction from the system controller 50, and supplies a necessary voltage to the respective parts including the recording medium for the necessary period.

Numerals 82 and 84 denote connectors; and 86, the power source comprising a primary battery such as an alkaline battery or a lithium battery, a secondary battery such as an NiCd battery, an NiMH battery or an Li battery, and an AC adapter, or an external battery.

Numeral 90 denotes a card controller which performs data transmission and reception with external recording media such as a memory card; 91, an interface for the external recording media such as a memory card; 92, a connector for connection with the external recording media such as a memory card; and 98, a recording medium detector for detecting whether or not an external recording medium 120 is attached to the connector 92.

In the present embodiment, one system of interfaces and connectors for connection with the recording medium is employed. However, the number of systems is not limited, and a single or plurality of systems of interfaces and connectors may be provided. Further, interfaces and connectors pursuant to different standards may be combined.

As the interfaces and connectors, cards in conformity with Personal Computer Memory Card International Association standards (PCMCIA cards) and cards in conformity with compact flash (CF®) card standards may be used. In a case where an interface and a connector in conformity with the PCMCIA standards, CF card standards and the like are used as the interface 91 and the connector 92, image data and management information attached to the image data are transmitted to or received from other peripheral devices such as a computer or a printer by connection of various communication cards such as a LAN card, a modem card, a USB card, an IEEE 1394 card, a P1284 card, an SCSI card and a PHS card.

The zoom ring 102 incorporates an encoder which outputs a pulse signal in accordance with rotation of the zoom ring.

The optical finder 104 can be used for image sensing without the electronic finder function of the image display unit 28. In the optical finder 104, realized are some of the functions of the notification unit 54 including the indication of focus state, the camera shake warning, the flash charge state, the shutter speed, the f number (aperture), the exposure compensation and the like.

A communication unit 110 has various communication functions for RS232C, USB, IEEE 1394, P1284, SCSI, modem, LAN, and wireless communication.

A connector/antenna 112 functions as a connector when the image sensing apparatus 100 is connected to another device via the communication unit 110, and as an antenna for wireless communication.

Numeral 120 denotes an external recording medium such as a memory card.

FIG. 2 is a top view showing an external appearance of the image sensing apparatus 100 shown in FIG. 1. In FIG. 2, numeral 200 denotes a lens barrel having a zoom function, which includes the image sensing lens 10, the shutter 12 and the like. In the lens barrel 200, the zoom lens 102 is provided.

In the present embodiment, when the zoom ring 102 is manually rotated in the right or left direction, the ring rotation sensor 46 detects the amount of rotation based on the rotation direction and angle, and actual zooming is performed by the zoom controller 44. Details of this processing will be described later.

In the release button 201 configured as a two-level switch, the shutter switch SW1 (62) is assigned to the first level, while the shutter switch SW2 (64) is assigned to the second level.

The power switch 70 also serves as an image sensing/reproduction mode switch. The normal position of the power switch 70 is the center. By turning the projecting portion provided in the front side of the apparatus from the power-OFF state to the left, the camera is powered on in the image sensing mode. By turning the projection portion to the right, the camera is powered on in the reproduction mode for image viewing. In the power-ON state, turning the switch to the left or right enables to switch from the reproduction mode to the image sensing mode, or from the image sensing mode to the reproduction mode. Further, depressing the power switch 70 enables to turn off the power of the image sensing apparatus 100.

Besides the above functions, the top part of the image sensing apparatus 100 comprises a part of the aforementioned notification unit 54 which displays information regarding the image sensing apparatus 100, and a mode dial switch 60 which selects functions of the apparatus.

Figure 3B:
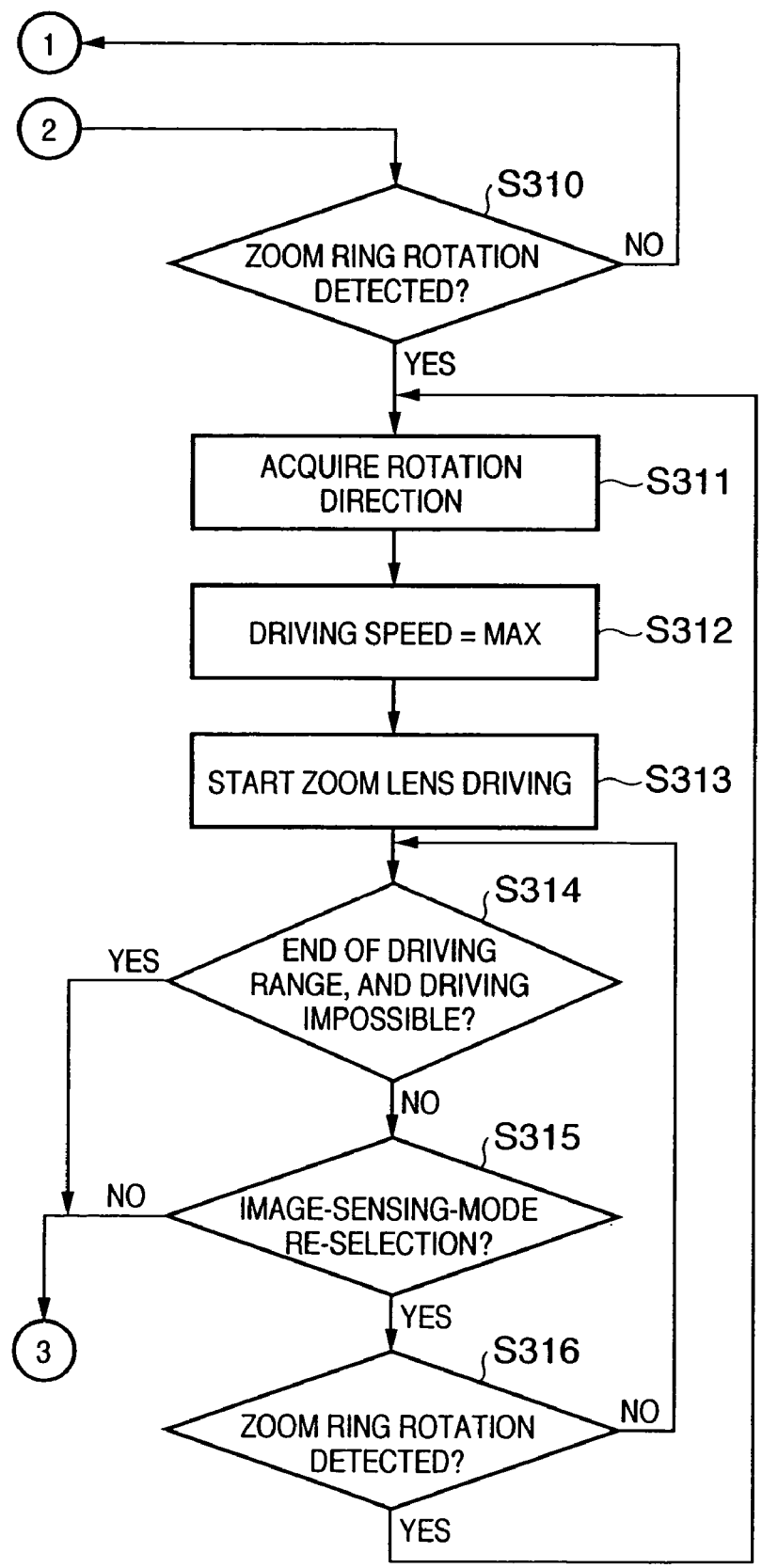

FIGS. 3A and 3B are flowcharts describing zoom lens driving processing according to the embodiment of the present invention. In the present embodiment, the zoom lens is driven at high speed when the zoom ring 102 is operated in combination with a predetermined operation member.

When image sensing is performed, normally a camera user operates the zoom ring 102 with the left hand. Therefore, for the predetermined operation member that is operated in combination with the zoom ring 102, it is preferable to employ a member provided within a range operable by the right hand, except the release switch 201. For this reason, the present embodiment employs the power switch 70 as the predetermined operation member. However, the predetermined operation member may be assigned to a switch besides the power switch 70 as long as it is provided within the range operable by the user's right hand.

As mentioned above, the power switch 70 also serves as an image sensing/reproduction mode changeover switch. In the image-sensing-mode selected state, selecting the image sensing mode again does not change the image sensing state or condition, thus does not influence the image sensing operation itself. Therefore, "in the image-sensing-mode selected state, the operation of re-selecting the image sensing mode by the power switch 70" (hereinafter referred to as an "image-sensing-mode re-selection state") is defined as operation of the predetermined operation member.

Hereinafter, zoom lens driving processing according to the present embodiment is described with reference to the flowchart in FIGS. 3A and 3B.

In step S301, it is determined whether or not the power switch 70 is in the image-sensing-mode re-selection state. If it is not in the image-sensing-mode re-selection state as a result of determination, the control proceeds to step S302.

In step S302, the ring rotation sensor 46 detects rotation of the zoom ring 102 through the encoder of the zoom ring 102. When it is determined that the zoom ring 102 is not rotated (NO in step S302), the control proceeds to step S308 to determine whether or not the zoom lens is being driven at this point. If it is determined that the zoom lens is not being driven, the control returns to step S301 to determine the state of the power switch 70. If the zoom lens is currently being driven in response to rotation of the zoom ring 102 prior to the determination in step S302, the control proceeds to step S307 to terminate the zoom lens driving, and then the control returns to step S301.

Meanwhile, in step S302, if the zoom ring 102 is rotated and the ring rotation sensor 46 detects rotation of the zoom ring 102, the control proceeds to step S303.

In step S303, the ring rotation sensor 46 acquires a rotation direction and a rotation angle from the encoder of the zoom ring 102. Since the zoom controller 44 according to the present embodiment is capable of changing the driving speed of the zoom lens, a driving speed for driving the zoom lens is calculated and set based on the acquired rotation angle in step S304.

In step S305, the zoom driving direction is determined based on the acquired rotation direction. For instance, the wide-angle direction is determined if the zoom ring 102 is rotated to the right, and the telephoto direction is determined if the zoom ring 102 is rotated to the left. Then, the zoom controller 44 starts the actual zoom lens driving at driving speed which is set in step S304.

In step S306, it is determined whether or not zooming in the telephoto direction is instructed at the telephoto end or whether or not zooming in the wide-angle direction is instructed at the wide-angle end. If one of the above cases is detected, since further driving is not possible, the control proceeds to step S307 to promptly terminate the zoom driving, and returns to step S301. If neither of the cases is detected in step S306, the control returns to step S302 to determine rotation of the zoom ring 102 and repeat the above-described processing. By virtue of this control, zoom driving continues during operation of the zoom ring 102 in accordance with the rotation direction and the rotation angle, unless the zoom ring 102 is operated at the end of the driving range.

Meanwhile, in step S301, if the power switch 70 is in the image-sensing-mode re-selection state, the control proceeds to step S310. In step S310, it is determined whether or not rotation of the zoom ring 102 is detected. If rotation is detected, the control proceeds to step S311; whereas if rotation is not detected, the control returns to step S301.

In step S311 where the power switch 70 is in the image-sensing-mode re-selection state, only the rotation direction of the zoom ring 102 is acquired, unlike the case where the power switch 70 is not in the image-sensing-mode re-selection state (i.e., operation in step S303). In step S312, the zoom controller 44 sets, as the zoom lens driving speed, the highest zoom driving speed possible. Note that although the above description has been provided on a case of setting the highest driving speed when the power switch 70 is in the image-sensing-mode re-selection state and the zoom ring 102 is operated, since the zoom controller 44 according to the present embodiment is capable of changing the zoom lens driving speed, the driving speed may not necessarily be the highest speed, and may be a predetermined speed which is set irrespective of the rotation angle of the zoom ring 102.

In step S313, the zoom controller 44 start driving the zoom lens at the highest speed in the acquired rotation direction, and the control proceeds to step S314.

In step S314, it is determined whether or not zooming in the telephoto direction is instructed at the telephoto end or whether or not zooming in the wide-angle direction is instructed at the wide-angle end. If one of the above cases is detected, since further driving is not possible, the control proceeds to step S307 to terminate the zoom lens driving.

Meanwhile, if neither of the cases is detected in step S314, the control proceeds to step S315 to determine again whether or not the power switch 70 is in the image-sensing-mode re-selection state. If the image-sensing-mode re-selection state is canceled, the control proceeds to step S307 to terminate the zoom lens driving. As described above, in a case where zoom lens driving is started in response to operation of the zoom ring 102 in the image-sensing-mode re-selection state, the zoom lens driving is terminated at the point of canceling the image-sensing-mode re-selection state regardless of the latter operation state of the zoom ring 102.

If the power switch 70 remains in the image-sensing-mode re-selection state in step S315, the control proceeds to step S316 to detect rotation of the zoom ring 102. If rotation is not detected, the control returns to step S314, and the processing from steps S314 through S316 is repeated while driving the zoom lens. In this manner, in a case where the image-sensing-mode re-selection state is continuously detected, the zoom lens can be driven at the highest speed until the end of the driving range without an operation of the zoom ring 102.

This is different from the normal zoom driving processing, where zoom driving does not continue unless the zoom ring 102 is continuously operated, as the processing in steps S302 to S308 performed in a case where the power switch 70 is not in the image-sensing-mode re-selection state.

If rotation of the zoom ring 102 is detected in step S316, the control returns to step S311 to acquire the rotation direction again, and the above processing is repeated. In this case, when the power switch 70 is in the image-sensing-mode re-selection state, if for instance the zoom ring is rotated to the wide-angle direction during zoom driving in the telephoto direction, it is possible to switch quickly to driving in the wide-angle direction at the highest speed. Furthermore, for instance during zoom driving in the telephoto direction, if the zoom ring 102 is continuously operated in the telephoto direction, the zoom lens driving in the telephoto direction can be continued at the highest speed.

In other words, in a case of operating only the zoom ring, the zoom lens is driven at driving speed corresponding to the rotation direction and the rotation angle operated on the zoom ring for the period of zoom ring operation. In comparison, if the zoom ring is operated while the power switch 70 is set in the image-sensing-mode re-selection state, as long as the power switch 70 is ON, the zoom lens driving continues at the highest speed until it reaches the end of the driving range of the zoom ring in the zoom direction, despite termination of the zoom ring operation. Furthermore, if the zoom ring is rotated in an opposite direction when the power switch is set in the image-sensing-mode re-selection state, the zoom direction is changed and the zoom lens can be driven at the highest speed in the changed direction.

As described above, according to the present embodiment, when zooming is performed by operating the zoom ring incorporated in the lens barrel, operating the zoom ring in combination with the predetermined operation member enables continuous zoom lens driving even after the zoom ring operation is terminated. By virtue of this, when a user wishes to perform continuous zoom lens driving, the user no longer has to keep operating the zoom ring. Therefore, it is possible to reduce burden on the user operation.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-031412 filed on Feb. 6, 2004, which is hereby incorporated herein by reference herein.

What is claimed is:

1. An image sensing apparatus comprising:
a zoom ring that is manually rotated by one hand of a user to designate driving of a zoom lens in one of a telephoto direction and a wide-angle direction when image sensing is performed;
an operation unit that is used for operating a function of the image sensing apparatus other than for a function relating to a zooming operation, which is operable by the other hand of the user while said zoom ring is rotated by the one hand of the user;
a driving unit of the zoom lens that is capable of changing the driving speed of the zoom lens in accordance with an operation amount of said zoom ring; and
a control unit mounted in the image sensing apparatus to control said driving unit to drive the zoom lens, by a first driving method performing, in a case where said zoom ring alone is operated, driving of the zoom lens in accordance with an operation amount of said zoom ring by the user, and by a second driving method performing, in a case where operation of said zoom ring is performed in combination with a predetermined operation of said operation unit, continuous driving of the zoom lens, even after discontinuation of the operation of said zoom ring, in either the telephoto direction or the wide-angle direction, based on a last designated driving direction of said zoom ring by the user, while said operation unit is continuously operated by the user during performance of the predetermined operation and terminating driving of the zoom lens upon discontinuation of the predetermined operation of said operation unit.

2. The image sensing apparatus according to claim 1, wherein said control unit controls said driving unit to drive the zoom lens at a predetermined constant driving speed in the first driving method.

3. The image sensing apparatus according to claim 2, wherein the predetermined constant driving speed is a highest speed possible to drive the zoom lens by said driving unit.

4. The image sensing apparatus according to claim 1, wherein said operation unit is a switch other than a shutter switch, and is provided at a position that is operable while the user holds the image sensing apparatus.

5. A control method of an image sensing apparatus having a zoom ring that is manually rotated by one hand of a user to designate driving of a zoom lens in one of a telephoto direction and a wide-angle direction when image sensing is performed, an operation unit that is used for operating a function of the image sensing apparatus other than a function relating to a zooming operation, which is operable by the other hand of the user while the zoom ring is rotated by the one hand of the user, and a driving unit of the zoom lens that is capable of changing a driving speed of the zoom lens in accordance with an operation amount of the zoom ring, said method comprising the steps of:

determining whether or not operation of the zoom ring is performed in combination with a predetermined operation of the operation unit;

detecting a driving direction of the zoom lens either in the telephoto direction or in the wide-angle direction, which is designated by the zoom ring when the operation unit is operated by the other hand of the user; and controlling the driving unit by a first driving method performing, in a case where it is determined that the zoom ring is operated alone, driving of the zoom lens in accordance with an operation amount of the zoom ring by the user;

controlling the driving unit by a second driving method performing, in a case where it is determined that the operation of the zoom ring is performed in combination with the predetermined operation of the operation unit, continuous driving of the zoom lens, even after discontinuation of the operation of said zoom ring, in either the telephoto direction or the wide-angle direction that, based on a last designated driving direction of said zoom ring by the user, when said operation unit is continuously operated by the user during performance of the predetermined operation and terminating driving of the zoom lens upon discontinuation of the predetermined operation of said operation unit.

6. The control method according to claim 5, wherein in the first driving method, the driving unit is controlled to drive the zoom lens at a predetermined constant driving speed.

7. The control method according to claim 6, wherein the predetermined constant driving speed is a highest speed possible to drive the zoom lens by the driving unit.

8. A non-transitory computer-readable storage medium that is readable by an information processing apparatus, which stores a program executable by the information processing apparatus, said program having program codes for performing the control method described in claim 5.

\* \* \* \* \*